C. A. HARPER.
Plow Cleaner.
No. 84,823.                         Patented Dec. 8, 1868.
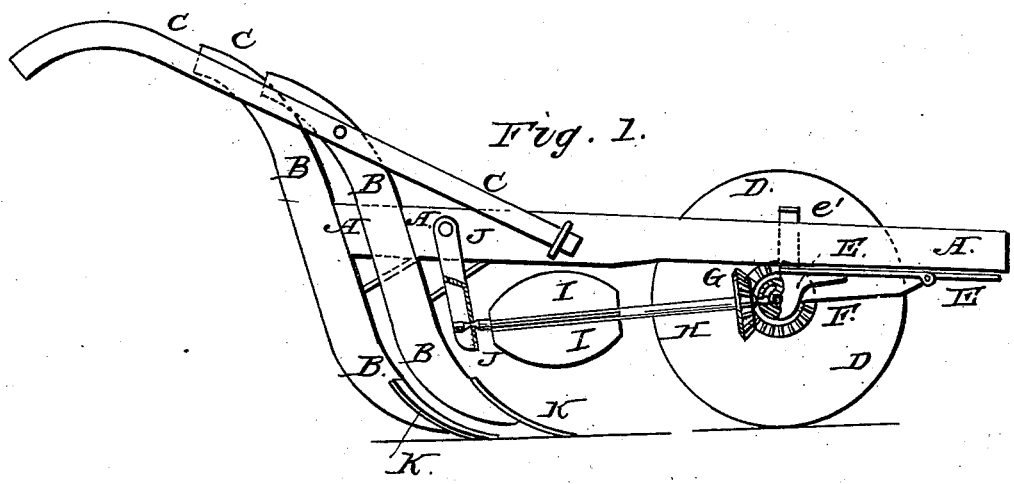
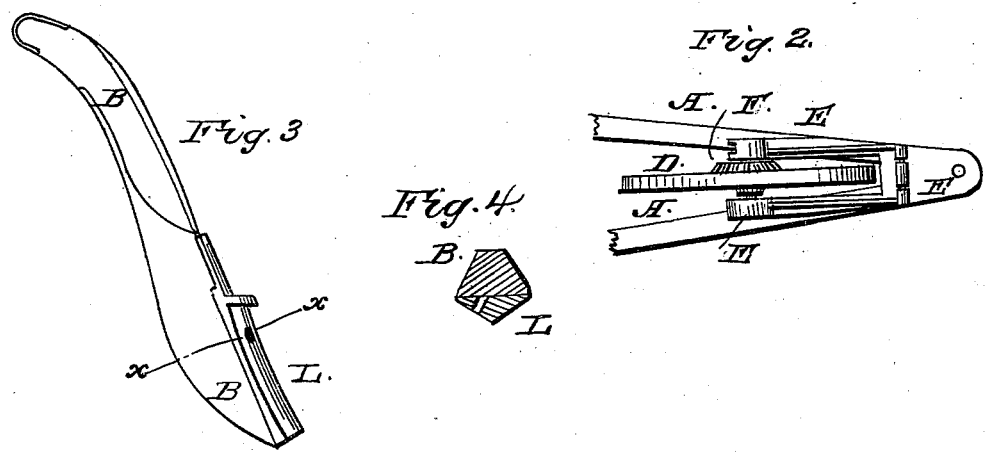

UNITED STATES PATENT OFFICE.

C. A. HARPER, OF WHEELING, INDIANA.

IMPROVEMENT IN CULTIVATORS.

Specification forming part of Letters Patent No. 84,823, dated December 8, 1868.

*To all whom it may concern:*

Be it known that I, C. A. HARPER, of Wheeling, in the county of Delaware and State of Indiana, have invented a new and useful Improvement in Cultivator; and I do hereby declare that the following is a full, clear, and exact description thereof, which will enable those skilled in the art to make and use the same, reference being had to the accompanying drawings, forming part of this specification, in which—

Figure 1 is a side view of my improved cultivator, parts being broken away to show the construction. Fig. 2 is a detail under-side view of the forward part of the cultivator-frame and its attachments. Fig. 3 is a side view of a modified form of the plow-standards. Fig. 4 is a detail cross-section of the same, taken through the line *x x*, Fig. 3.

Similar letters of reference indicate corresponding parts.

My invention has for its object to improve the construction of my improved cultivator, patented January 7, 1868, and numbered 73,181, so as to make it more convenient and effective in operation; and it consists in the construction and combination of various parts of the cultivator, as hereinafter more fully described.

A are the cultivator beams or frame, to the forward end of which the draft is attached, in the ordinary manner, and to the rear end of which the plow-standards B are secured, and C are the handles, which are attached to the beams or frame A and to the standards B, as shown.

With the forward part of the beams or frame A is connected the wheel D, the journals of which revolve in bearings in the rear end of the slotted plate or frame E.

The forward part of the plate or frame E is hinged or jointed, so that the wheel D may have a vertical movement, enabling it to adjust itself to the roughness or unevenness of the ground without interfering with the position of the beams or frame A.

The forward end of the hinged plate or frame E is pivoted to the forward part of the beams or frame A, so that the wheel D may have a lateral movement, to adjust itself to follow the horse in passing around bends in the rows of plants, stumps, stones, and other obstructions.

The rear ends of the hinged plate or frame E are prevented from dropping down too far by the stops *e'*, attached to the said rear ends of the said plate, and which are formed with outwardly-projecting ears or flanges, which overlap the upper sides of the beams A, so as to rest upon them when the wheel drops down, the said stops being so formed as not to interfere with the desired lateral movement of the wheel D.

To the side of the wheel D is attached, or upon it is formed, a small bevel-gear wheel, F, into the teeth of which mesh the teeth of the bevel-gear wheel G, attached to the shaft H, to the rear part of which are attached the flanges or wings I, which form the clodder. The forward end of the shaft H is formed with a ball or head, which enters and works in a slot in the rear end of the hinged plate or frame E.

Upon the rear end of the shaft H is formed a ball or head, which works in a slot in the lower part of the arm J, the upper end of which is pivoted to the cultivator-frame.

By this construction and arrangement, the shaft H can adjust itself to the varying positions of the wheel D, so that the teeth of the bevel-gear wheel G may always mesh into the teeth of the bevel-gear wheel F, whatever may be the position of the wheel D.

K are the plows, which may be attached directly to the lower part of the standards B, but which I prefer to attach to detachable seats L.

The seats L are made with angular faces, as shown in Figs. 3 and 4, so that the plows may be attached at such an inclination as to throw the earth toward or from the plants, as may be desired.

If it should be desired to use ordinary shovel-plows in the ordinary manner, the seats L may be detached and the said shovels attached directly to the standards B.

I claim as new and desire to secure by Letters Patent—

1. Connecting the wheel D to the cultivator beams or frame A by means of the hinged or jointed slotted plate or frame E, substantially as herein shown and described, and for the purposes set forth.

2. Securing the flanged shaft H, or clodder, in its bearings by means of balls or heads formed upon the ends of said shaft, substantially as herein shown and described, and for the purpose set forth.

3. The combination of the swinging arm J with the rear end of the flanged shaft or clodder H, and with the frame of the cultivator, substantially as herein shown and described, and for the purpose set forth.

The above specification of my invention signed by me this 15th day of August, 1868.

C. A. HARPER.

Witnesses:
 ALEX. CLIFT,
 GEO. HEDGLAND.